April 3, 1962   V. GAVREAU ETAL   3,028,530
ELECTRIC SERVO-CONTROL FOR MACHINE-TOOLS
Filed March 28, 1960   3 Sheets-Sheet 1

INVENTORS
VLADIMIR GAVREAU
ALBERT CALAORA
MARCEL MIANE
BY Larson and Taylor
ATTORNEY

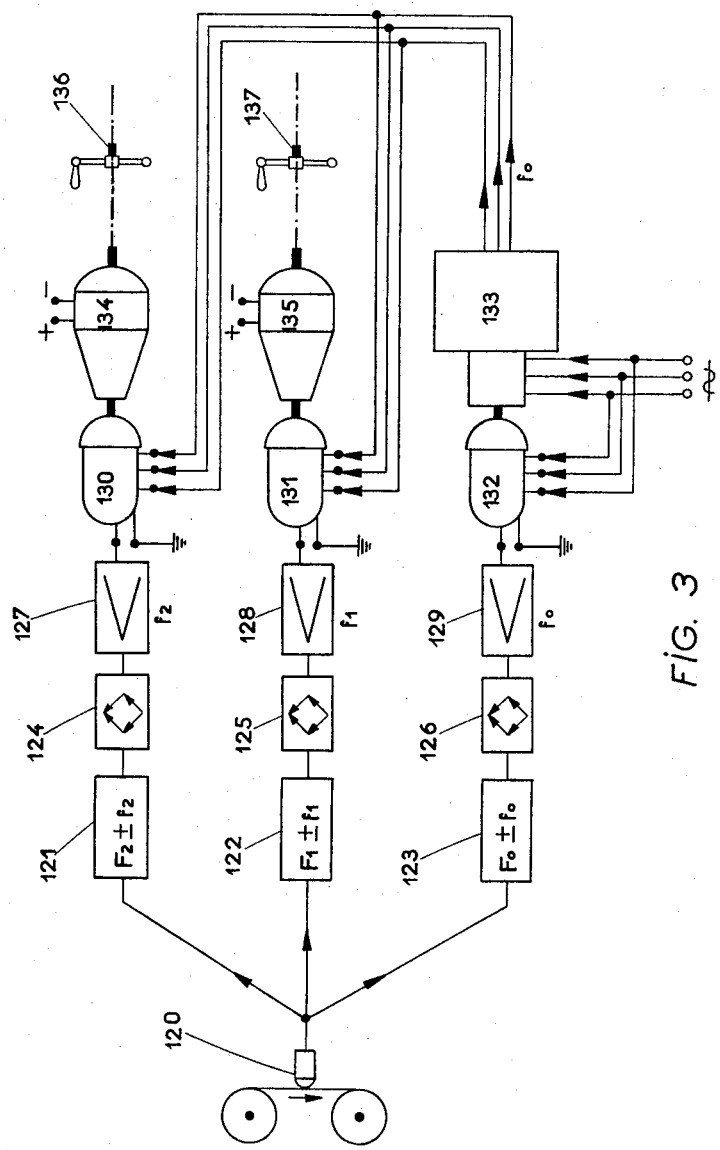

United States Patent Office 3,028,530
Patented Apr. 3, 1962

3,028,530
ELECTRIC SERVO-CONTROL FOR MACHINE TOOLS
Vladimir Gavreau, Albert Calaora, and Marcel Miane, Marseille, France, assignors to Centre National de la Recherche Scientifique, Paris, France, a state administration of France
Filed Mar. 28, 1960, Ser. No. 17,923
Claims priority, application France Apr. 1, 1959
6 Claims. (Cl. 318—27)

The present invention relates to electric control motors of the servo-motor type having fixed commutator and rotating brushes, in particular for the control of machine-tools from a pre-recorded programme.

An electric motor which is specially suitable for the control of industrial machines and in particular of machine-tools starting from a recorded programme, for example on a magnetic tape, has been described in French Patent No. 1,142,019 granted to the present applicant on March 25, 1957, and in the Italian Patent No. 574,430 granted on March 18, 1958, said electric motor comprising a stator toroidally wound in a Gramme ring comprising $n$ turns, a fixed commutator comprising $n$ angularly displaced conductive bars, $n$ conductors connecting the $n$ conductive bars to the $n$ turns of the Gramme ring, a driving shaft carrying two rotating brushes which supply with direct current two diametrically opposite conductive bars and a rotor (constituted by a permanent magnet or by a two-pole electro-magnet), the shaft of said rotor, which constitutes the driven shaft being thereby driven in synchronism with the rotating brushes which are furthermore mounted in such manner that the centrifugal force has a tendency to apply said rotating brushes against the conductive bars of the fixed commutator.

The rotor shaft or driven shaft of a motor of this type provides a means of carrying out the control of an industrial machine such as a machine-tool when the control shaft which carries the rotating shafts is driven in rotation as a function of the recording by means of a driving motor, for example of the receiving portion or rotor of a selsyn, by virtue of the fact that the driving of the control requires a small power, whereas a substantially higher power (which can reach several kilowatts) is available on the driven shaft, the power current to the motor, in accordance with said patents, being supplied from the voltage source which supplies direct current to the rotating brushes.

While a motor of this type provides a means of driving in synchronism with a small power available in the receiving portion of the selsyn while still having on the rotor shafts a sufficient torque to drive a machine-tool hand-wheel for example, the appearance has nevertheles been observed, in certain cases, of a "hunting" effect which takes the form of parasitic oscillations.

The present invention is directed to the improvement of a motor of this type which is particularly suitable for the control of machine-tools, having the object of avoiding any danger of parasitic oscillations or of hunting of the rotor, and to increase still further the power and precision of the control, in such manner as to permit of its direct utilization for automatic control and accurate remote control of industrial machines, for example in dependence on a pre-recorded programme.

In accordance with the present invention, the rotating parts which are driven by the driving motor and co-operate with the bars of the fixed commutator are no longer constituted by one brush per pole of the rotor but, for each pole, by a pair of brushes connected electrically to each other so as to delimit, on the stator with toroidal windings supplied with current by the brushes through co-operating strips and associated conductors, relatively wide non-excited zones which are equivalent to relatively wide poles rotating in synchronism with said rotating parts and driving the poles of the rotor, the width of each of said zones being preferably equal to that of each of the poles of the rotor.

By virtue of this arrangement, the rotor is driven in rotation with great precision, just as if the stator were provided with rotating projecting poles.

The present invention therefore has for its object an electric control motor, in particular for the automatic control of machine-tools by means of a pre-recorded programme, comprising a stator toroidally wound in a Gramme ring comprising $n$ elementary windings, a stationary commutator comprising $n$ conductive bars which are angularly displaced, $n$ conductors connecting said $n$ conductive bars to the $n$ windings of the Gramme ring considered in the same order, a rotor having at least two poles and fixed on a driven shaft, and a driving shaft which carries, for each pole of the rotor, a rotating member supplied with electric current and applied against said conductive bars, characterized in that each rotating member is constituted by two brushes which are connected electrically to each other.

In a preferred form of embodiment, each rotating part is constituted by two brushes which form between each other an angle which is substantially equal to the angle at the centre which delimits each pole of the rotor.

The stator is preferably of the slotted type with $n/2$ slots, and the Gramme ring comprises two elementary windings per slot. In this case, the virtual projecting poles of the stator which rotates in synchronism with the rotating members which supply current to said poles, are constituted by two, three or four (according to the angle formed by the two brushes of said members) "mushrooms" or teeth of the stator between successive slots.

In order to make the invention more clearly understood, it will now be described with reference to its application to two particular forms of embodiment shown in the accompanying diagrammatic drawings in which:

FIG. 3 shows a circuit diagram for the automatic control of a lathe by means of two motors according to the invention.

Figure 1:
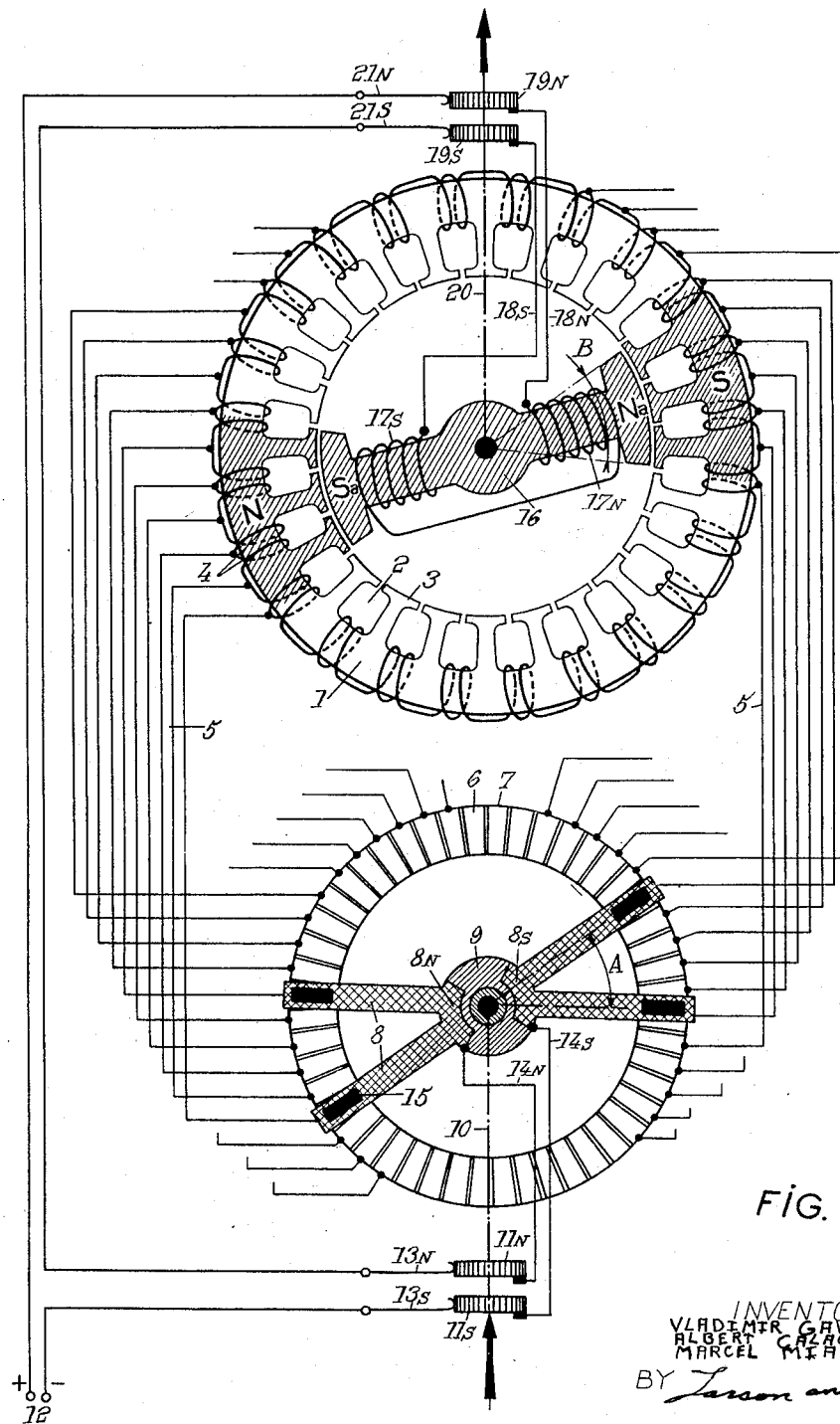
FIG. 1 illustrates the application of the invention to a motor having a stationary commutator and rotating brushes, supplied with direct current.

In FIG. 1, which illustrates the application of the invention to a direct current motor, the motor comprises a stator 1, having for example twenty-four slots 2, forming spaces for twenty-four "mushrooms" or teeth 3, of the type employed in three-phase motors of twenty-five cycles.

The stator is wound toroidally in a Gramme ring with preferably two elementary windings or half-windings 4 per slot 2, each of the half-windings 4 (shown in FIG. 1 by a single turn for the purpose of simplifying the drawing) being connected by a conductor 5 to one of the conductive bars 6 of a commutator 7, on which there are laterally mounted forty eight bars regularly spaced apart at an angle equal to $$\frac{360}{48} = 7.5°$$

the order of succession of the bars 6 and of the associated windings 4 being the same as that shown in the drawings.

This stationary commutator 7 co-operates with rotating direct-current supply members, which are constituted, in accordance with the essential characteristic feature of the invention, by two pairs 8N, 8S of brushes 8 mounted on an insulating cylinder 9 keyed on a shaft 10 constituting the driving shaft. On this shaft 10 there are also mounted two rings 11N and 11S which are supplied from a source 12 of direct current by two stationary brushes 13N and 13S respectively and connected by conductors 14N, 14S to the two brushes 8 of each pair 8N, 8S which are connected to each other.

Each of the brushes 8 is preferably constituted by a thin elastic strip of Phosphor bronze provided at its extremity with a carbon 15 mounted in a box having thin walls (which is not illustrated in order to simplify the figure), a spiral spring being housed at the bottom of each box so that the carbon 15 can be applied evenly and resiliently against the bars of the commutator 7, thereby avoiding all danger of sparks and uneven wear of the commutator bars during the rotation at variable speed of the rotating brushes 8. The forms of embodiment of means for mounting carbons on rotating brushes are well known to those skilled in the art; suitable forms of these mounting means are described, for example, in the patents referred to above.

By reason of the fact that the pair of brushes 8N is connected to the positive pole and the pair of brushes 8S is connected to the negative pole of the source 12, a north pole is thus created (as shown by shaded lines under the reference N) by the bars 6 against which said brushes and associated conductors 5 are applied and between the half-windings 4 of the toroidal winding which are connected to the bars 6 on which are mounted the brushes 8N; and a south pole (shaded and indicated by reference S) is thereby created between the half-windings 4 connected to the bars 6 against which are applied the brushes 8S, while the current flows between the zones N and S through the two unshaded halves of the toroidal winding, said halves being connected in parallel, whilst the intermediate half-windings of the shaded zones N and S are not excited.

As regards to rotor 16 of the motor, said rotor is provided with two projecting poles having the references N$a$ (north pole) and S$a$ (south pole) and can be constituted either by a permanent magnet or, as shown in the drawings, by an electro-magnet comprising two windings 17N, 17S in series, supplied by conductors 18N, 18S from two rings 19N, 19S. These rings 19N, 19S are mounted on the same shaft 20 as the rotor 16 and are supplied by brushes 21N, 21S respectively, which are connected in series with the brushes 13N, 13S to the terminals of the source 12 of direct current.

The driving motor illustrated in FIG. 1 operates as follows:

When at rest, for example in the position of the rotating members 8N, 8S as illustrated, a north pole N and south pole S is created in the armature of the stator 1 as explained above. The north pole N$a$ and south pole S$a$ of the rotor are then respectively located opposite the poles S and N as shown in the diagram.

When the shaft 10 is driven in rotation, for example by the receiving portion of the rotor of a selsyn controlled by a programme which is pre-recorded on a recording support such as a magnetic tape (as indicated in the patents cited above), the rotation of the pairs 8N, 8S of brushes 8 causes the synchronous rotation of the virtual poles N and S. This gives rise simultaneously to the regular synchronous rotation, with a negligible delay, of the poles S$a$ and N$a$ (which follow the poles N and S respectively) and consequently of the shaft 20 constituting the driven shaft of the servo-motor or control motor and which can drive, without producing parasitic oscillations, for example, any drive-shaft of a machine-tool or of another type of industrial machine, either directly or by means of gears or of other mechanical or electrical transmission means with or without torque conversion, as the motor in accordance with the present invention itself constitutes a torque or power amplifier having a very large ratio.

In order to prevent any parasitic oscillation, the width of the rotating poles N and S of the armature 1 (each provided with three teeth or "mushrooms" 3) should preferably be substantially equal to that of the projecting poles S$a$ and N$a$ of the rotor 16 as shown in the figure. Consequently, the angle A between the two brushes 8 of any pair such as 8S is substantially equal to the angle B at the centre which delimits each projecting pole of the rotor.

It is of course understood that the assembly of FIG. 1 could be applied to a single-phase alternating current supply and, in that case, the magnetic field N—S is an alternating field instead of a direct current field.

Figure 2:
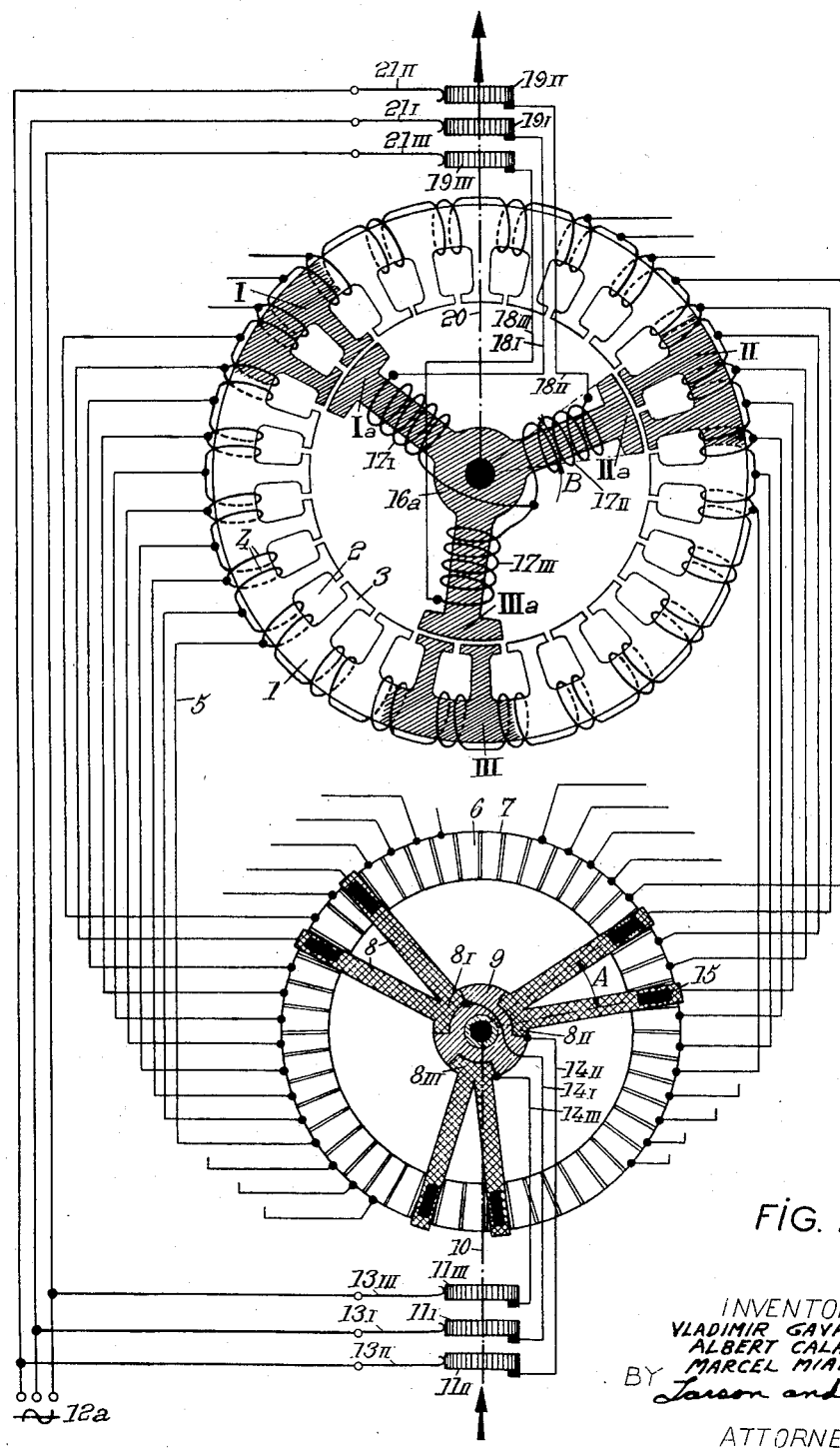
FIG. 2 illustrates the application to a motor with stationary commutator and rotating brushes, supplied with three-phase current.

In FIG. 2 is illustrated the application of the invention to a control motor supplied with three-phase current and the same reference numbers have been employed in FIGS. 1 and 2 to designate equivalent parts.

It will be observed that the stator 1 and the commutator 7 are identical in both forms of construction. On the other hand, owing to the fact that three-phase current is employed, there have been provided three pairs $8_I$, $8_{II}$, $8_{III}$ of brushes to supply the stator 1 and three projecting poles I$a$, II$a$, III$a$ (produced by the windings $17_I$, $17_{II}$ and $17_{III}$) for the rotor 16$a$; consequently, the indices I, II and III given in FIG. 2 for the three phases of the current supplied by the three-phase line 12$a$ are the same as those which were given the references N and S (for the two direct current polarities) in FIG. 1.

It would of course be possible to employ, instead of the rotor as illustrated, with three projecting poles I$a$, II$a$, III$a$, a three-phase rotor with slots, but the precision of the control is liable to be less in this case.

The operation of the motor of FIG. 2 is identical to that of the motor of FIG. 1, the two polarities being replaced by the three phases I, II, III while the rotation of the shaft 10, and therefore of the pairs $8_I$, $8_{II}$, $8_{III}$ of brushes, causes rotation of the virtual poles I, II, III, the effect of which is to produce a synchronous driving of the poles I$a$, II$a$, III$a$ of the rotor and therefore of the driven shaft 20. It will be noted that a poly-phase motor in accordance with FIG. 2 is not a motor of the double rotating field type, since the virtual projecting poles of the stator 1 accurately drive the corresponding poles of the rotor.

It should be noted that if a single brush per pole of the stator is employed instead of two brushes per pole, said brush having an angular opening in the vicinity of the angle A, the driving movement thus obtained is much less satisfactory, in the first place on account of the substantial inertia of such a large brush and in the second place on account of the problem raised by the necessity of ensuring uniform contact between such a brush and the commutator bars.

It can be seen that, in accordance with the present invention, control motors are constructed which are particularly suitable for driving the different crank-handles of a machine-tool in dependence on a pre-recorded programme, for example on a magnetic tape, by means of an assembly of the type described in the patents previously cited or an equivalent assembly preferably provided with a driving selsyn for each motor in accordance with the invention. By virtue of the arrangement of the brushes in accordance with the present invention, the magnetic saturation of the stator at the center of each virtual rotating pole of said stator is thereby prevented, thus making it possible to delimit the width of the rotating poles with accuracy. This results in a powerful and very accurate control starting from a small torque on the driving shaft, since even a very small displacement between the poles of the rotor and the poles of the stator produces a considerable restoring force. Furthermore, experience has shown that this arrangement of rotating brushes entirely prevents parasitic oscillations of the rotor (especially in the case of a direct current supply).

As will be readily understood and as it already follows in any case from the foregoing description, the present invention is in no way limited to any one method of application or to these methods of construction of its various parts which have been more particularly contemplated, but is intended on the contrary to bring all alternative forms within its scope.

For the purpose of illustrating a suitable circuit for the practical operation of a motor in accordance with the present invention, there has been shown in FIG. 3 a circuit diagram for the automatic control of a lathe by means of two motors having double rotating brushes supplied with direct current.

The circuit shown in the diagram provides a means for the reproduction of movements recorded on a magnetic tape in accordance with a known method. There may either be provided three tracks read by three magnetophone heads or alternatively, as shown in FIG. 3, a magnetophone with a single track, on which there has been recorded a complex current composed of a reference current having a frequency $f_0$, and currents having frequencies $f_1$ and $f_2$ serving to control both crank-handles. These different currents have been recorded by means of carrier currents having frequencies $F_0$, $F_1$, $F_2$, respectively modulated by $f_0$, $f_1$ and $f_2$, thereby introducing the frequencies $F_0 \pm f_0$, $F_1 \pm f_1$, $F_2 \pm f_2$. For example $F_0$ can be modulated by the current of 50 cycles from the general supply mains. Similarly $F_1$ can be modulated by the current $f_1$ supplied by the rotor of a recording selsyn rigidly coupled mechanically to the crank-handle concerned, the stator of said selsyn being supplied by the 50-cycle generator supply mains in such manner that $f_1$ varies for example between 25 and 75 cycles, depending on whether the rotor rotates in one direction or in the other, while the frequency $f_1=50$ cycles corresponds to the stationary position of the crank-handle. Similarly, $F_2$ is modulated by the current $f_2$ corresponding to the second crank-handle of the lathe.

The complex recording thus obtained is read by the single magnetic head of the magnetophone shown in diagrammatic form at 120 in FIG. 3. The three component currents are separated by the band-pass filters 121, 122, 123, then are detected by the bridges 124, 125, 126 which rectify their two alternations and are finally amplified by the amplifiers 127, 128, 129 before supplying respectively the rotors of the selsyns 130, 131, 132.

The selsyn 132, the stator of which is supplied by the three-phase mains supply at 50 cycles drives the rotating brushes of the rotating-field frequency-transformer 133. This latter is constituted by the stator of an ordinary three-phase motor and by the rotor of an ordinary universal motor having a lateral commutator; the unit formed by the stator and rotor locked in a fixed position constitutes a transformer. When the brushes do not rotate, the frequency supplied by this transformer is the same as that of the supply mains which supplies current to said transformer, namely 50 cycles. When the brushes of 133 rotate at a frequency which is equal to $f_0-50$ cycles or at: 50 cycles$-f_0$, the transformer supplies a frequency of $f_0-50+50=f_0$, or $50-(50-f_0)=f_0$, which is therefore always at a frequency $f_0$.

The three-phase reference current $f_0$ which is thus obtained supplies the stators of the other two selsyns 130 and 131. In this manner, the rotor of 130 will rotate either in one direction or in the other at the speed $f_1-f_0$ or $f_0-f_1$ depending on whether $f_1$ is greater or smaller than $f_0$, and in its movement it will drive at the same speed the double rotating brushes of the servo-motor 134 of the type illustrated in FIG. 1, while said servo-motor will drive in its turn the controlled crank-handle 136. Similarly the rotor of the selsyn 131 drives the second crank-handle 137 of the controlled machine-tool.

What we claim is:

1. An electric control motor, in particular for the automatic control of machine-tools from a pre-recorded programme, comprising a stator which is toroidally wound in a Gramme ring provided with $n$ elementary windings, a stationary commutator comprising $n$ conductive bars which are angularly displaced, $n$ conductors connecting the $n$ bars to the $n$ windings of the Gramme ring considered in the same order, a rotor having at least two poles and fixed on a driven shaft, and a driving shaft on which is mounted, for each pole of the rotor, a rotating member which is supplied with electric current and applied against said bars, in which each rotating member is constituted by two rotating brushes electrically connected to each other.

2. An electric control motor in accordance with claim 1, in which each rotating member is constituted by two brushes which form between each other an angle which is substantially equal to the angle at the centre which delimits each pole of the rotor.

3. An electric control motor in accordance with claim 1 in which each rotating member is constituted by an elastic metallic strip on which is mounted a box, a carbon housed in said box and a spring applying said carbon against the commutator bars.

4. An electric control motor in accordance with claim 1, in which the stator is of the slotted type with $$\frac{n}{2}$$

slots, the Gramme ring comprising two elementary windings per slot.

5. An electric control motor in accordance with claim 1 in which the rotor comprises two projecting poles and in which the driving shaft carries two rotating members supplied with direct current.

6. An electric control motor in accordance with claim 1 in which the rotor is constituted by an electro-magnet having three projecting poles each carrying an excitation coil and in which on the driving shaft are mounted three rotating members, the three excitation coils on the one hand and the three rotating members on the other hand being supplied with three-phase current.

References Cited in the file of this patent
UNITED STATES PATENTS 2,946,938    Gavreau et al. _____ July 26, 1960